United States Patent
Lan et al.

(10) Patent No.: US 7,362,967 B2
(45) Date of Patent: Apr. 22, 2008

(54) DIGITAL CAMERA AND MANUAL FOCUS METHOD THEREOF

(75) Inventors: Zhi-Qiang Lan, Dong-Guan (CN); An-Jin Hu, Dong-Guan (CN)

(73) Assignee: Asia Optical Co., Inc. (TW)

( * ) Notice: Subject to any disclaimer, the term of this patent is extended or adjusted under 35 U.S.C. 154(b) by 421 days.

(21) Appl. No.: 11/092,935

(22) Filed: Mar. 30, 2005

(65) Prior Publication Data

US 2005/0259161 A1 Nov. 24, 2005

(30) Foreign Application Priority Data

May 19, 2004 (TW) ............................. 93114081 A

(51) Int. Cl.
*G03B 17/00* (2006.01)
(52) U.S. Cl. .................... 396/79; 396/147; 348/333.11
(58) Field of Classification Search ................. 396/79, 396/147, 373–374, 148, 378; 348/240.99, 348/333.11
See application file for complete search history.

(56) References Cited

U.S. PATENT DOCUMENTS

2005/0225650 A1* 10/2005 Hayashi et al. .......... 348/231.3
2005/0270399 A1* 12/2005 Kawaguchi et al. ... 348/333.11
2006/0210264 A1* 9/2006 Saga ........................... 396/287
2007/0127138 A1* 6/2007 Nakahara ..................... 359/694

FOREIGN PATENT DOCUMENTS

JP         11298791        * 10/1999

* cited by examiner

*Primary Examiner*—Christopher Mahoney
(74) *Attorney, Agent, or Firm*—Rader Fishman & Grauer PLLC

(57) ABSTRACT

A digital camera and a method for manually focusing the digital camera are disclosed. The digital camera includes an image sensing unit, a buffer memory unit, an image processing unit, and an image display unit. The image sensing unit senses a signal and produces a full-view area image and a focus-view area image. The image sensing unit selectively outputs the full-view area image and the focus-view area image to the buffer memory unit. When the image sensing unit outputs the focus-view area image to the buffer memory unit, the buffer memory unit outputs the focus-view area image to the image display unit for manual focusing operation by users.

11 Claims, 5 Drawing Sheets

DIGITAL CAMERA AND MANUAL FOCUS METHOD THEREOF

CROSS REFERENCE TO RELATED APPLICATIONS

This application claims priority of Taiwan Patent Application Serial No. 093114081 entitled "Digital Camera and Manual Focus Method Thereof", filed May 19, 2004.

FIELD OF THE INVENTION

The present invention relates to a digital camera and a method for manually focusing the digital camera, and particularly to a digital camera with an image sensing unit and a method providing a focus-view area image allowing a user to manually focus the digital camera.

BACKGROUND OF THE INVENTION

Digital camera has become more and more powerful in recent years. While the image pixel resolution of the camera increases and the peripheral functionality expands, the price keeps going down. As a result, the digital camera has replaced the conventional camera, and became a popular consumer electronic product.

Since one of the developing trends of digital camera is to achieve better mobility, the digital camera becomes smaller in size. Consequently, the reduced size of digital camera restricts the display device of digital camera, e.g. LCD, having diagonal dimension in about one to two inches and resolution of about 100,000 pixels. Therefore, resolution of LCD in digital camera is much lower than final image, e.g. mega pixels. FIG. 1 illustrates a conventional digital camera 100. A lens 102 receives and transfers image to an image sensing unit 104, such as Charge Coupled Device (CCD) or Complementary Metal-Oxide Semiconductor (CMOS) sensors. The image is then passed to a buffer memory 106. An image resize unit 108 resizes the image according to the capability of LCD 110 for display. For example, a primer digital camera typically provides more than 3 mega pixels, thus the image must be shrunk to fit the LCD 110. Although the digital camera 100 usually provides automatic focus function, however, users need manual focus function to obtain better quality or special effect in many conditions, e.g. high contrast scenery, macro focus mode, or different depth of views. However, manual focus becomes insufficient since the size of LCD 110 restricts the resolution of image and the full-view area image in the LCD 110 becomes unclear and blur. Therefore, a digital camera and method for improving accuracy of manual focus using the LCD 110 outputting a focus-view area image are desired.

SUMMARY OF THE INVENTION

It is one aspect of the present invention to provide a digital camera and a method for manually focusing the digital camera utilizing an image sensing unit to provide a focus-view area image for improving accuracy of focusing.

It is another aspect of the present invention to provide a digital camera and a focusing method allowing a user to select focus area on demand.

The digital camera in accordance with the present invention includes a buffer memory unit, an image sensing unit, an image processing unit, an image display unit, a storage unit, a focus button, and a storage button. The image sensing unit, coupled to the buffer memory unit, senses a light signal to produce a full-view area image and a focus-view area image. The image sensing unit selectively outputs the full-view area image and the focus-view area image to the buffer memory unit. The image processing unit is coupled to the buffer memory unit. The image display unit is coupled to the image processing unit and the buffer memory unit.

The method for manually focusing a digital camera in accordance with the present invention includes the following steps: (a) selecting range of the outputted image for the image sensing unit; (b) the image sensing unit outputting an area image according to the selected range to the buffer memory unit; (c) the image processing unit retrieving the area image in the buffer memory unit and resizing the area image according to a predetermined size; (d) outputting the resized area image to the image display unit allowing browsing by a user; (e) determining a status of the focus button; and (f) repeating the step (a) to step (d), when the focus button is enabled, for outputting a focus-view area image allowing the user manually focusing the focus-view area image.

Moreover, the image sensing unit may produce the focus-view area image by enlarging a portion of the full-view area image, and this alternative may need additional process by image processing unit and raise the total cost.

DETAILED DESCRIPTION OF THE INVENTION

Figure 1:
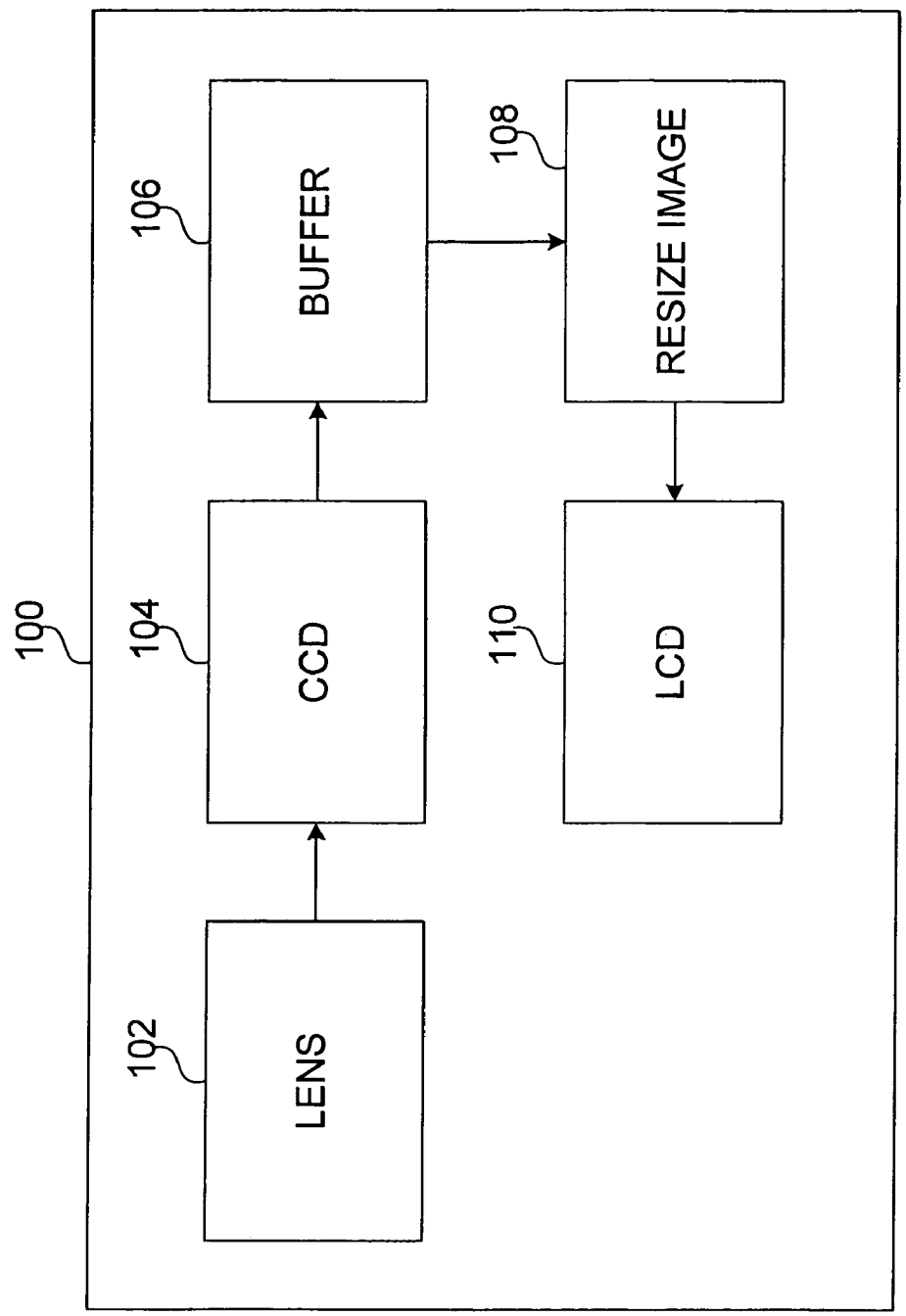
FIG. 1 illustrates a conventional digital camera.
Figure 2:
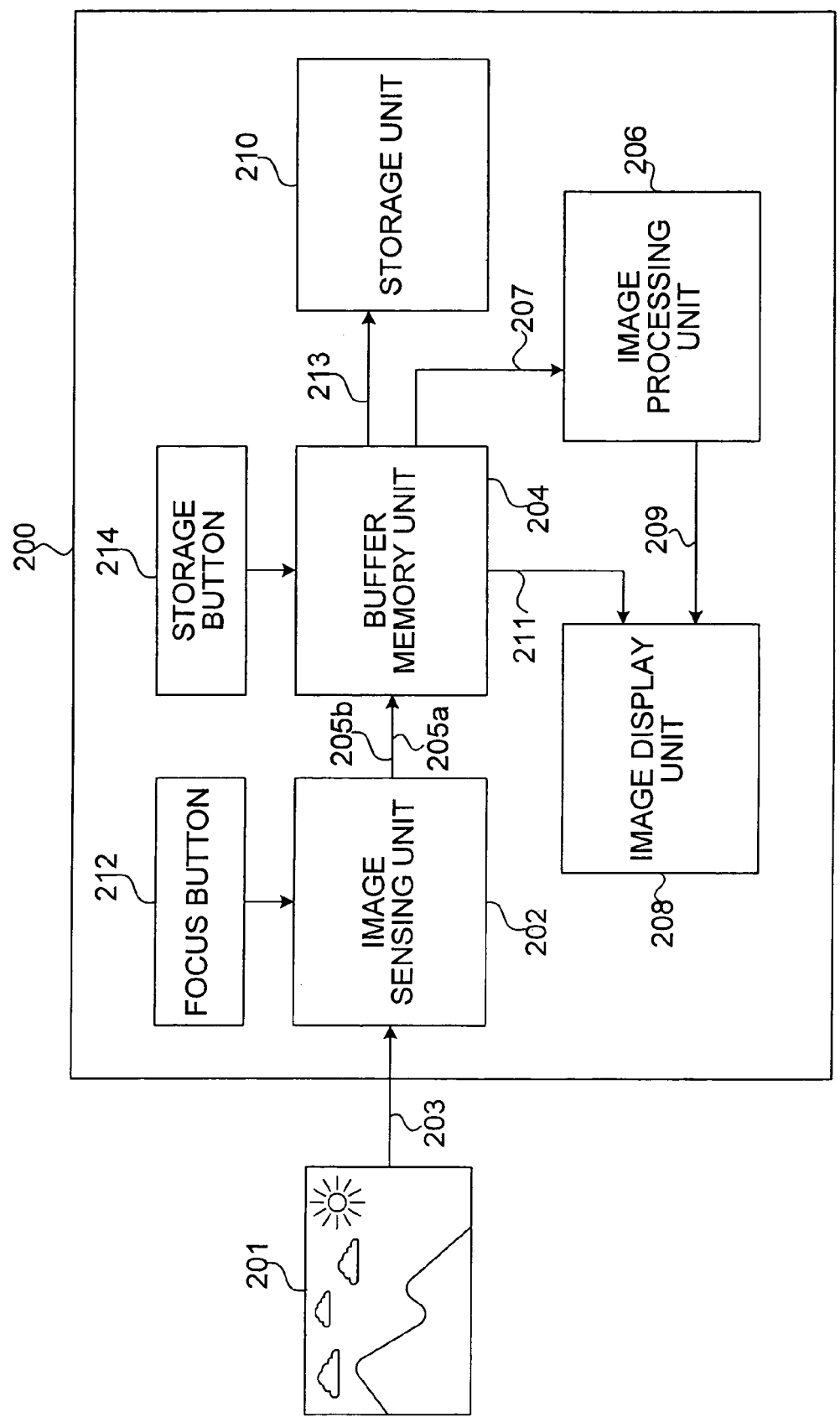
FIG. 2 illustrates a digital camera in accordance with the present invention.

FIG. 2 illustrates a digital camera 200 in accordance with the present invention. The digital camera 200 includes an image sensing unit 202, a buffer memory unit 204, an image processing unit 206, an image display unit 208, a storage unit 210, a focus button 212, and a storage button 214. First, the digital camera 200 points to the scenery 201, and the image sensing unit 202 senses an analog signal 203 (e.g. light) from the scene 201. Then the image sensing unit 202 selectively produces a full-view area image 205a and a focus-view area image 205b. One should understand that the image sensing unit 202 may be a charge coupled device (CCD) whose output range is adjustable, such as MT9T001 image sensor made by Micron Technology Inc. Moreover, the image sensing unit 202 outputs the full-view area image 205a and the focus-view area image 205b in digital form. The full-view area image 205a and focus-view area image 205b will be illustrated in further detail later. The image sensing unit 202 is coupled to the buffer memory unit 204 and focus button 212. When the focus button 212 is disabled, the image sensing unit 202 outputs the full-view area image 205a to the buffer memory unit 204. The buffer memory unit 204 of the present invention includes any well-known memory device, such as SRAM, DRAM, or the likes. When the focus button 212 is enabled, the image sensing unit 202 outputs the focus-view area image 205b to the buffer memory unit 204. The image processing unit 206 is coupled to the buffer memory unit 204. When the image sensing unit 202 outputs the full-view area image 205a to the buffer memory unit 204, the image processing unit 206 accesses the full-view area image 207 from the buffer memory unit 204. The full-view area image 207 is a high quality image, such as 3 mega-pixels. The image processing unit 206 resizes the full-view area image 207 according to a predetermined size, and the resized image 209 is sent to image display unit 208. Users may preview the resized image 209 from the image display unit 208 and determine whether to proceed the following operations, such as focusing, shooting, etc.

The image display unit 208 is coupled to the image processing unit 206 and the buffer memory unit 204. When the focus button 212 is enabled, the buffer memory unit 204 directly sends a focus-view area image 211 to the image display unit 208, without additional processing by image processing unit 206. Since the focus-view area image 211 is produced by image sensing unit 202 directly rather than processed by the image processing unit 206, the focus-view area image 211 preserves its fidelity. Moreover, the focusing efficiency is increased since additional processing by image processing unit 206 is not required. Therefore, users may manually obtain accurate focusing through the focus-view area image 211 from the image display unit 208. The operation of manual focusing is well known to those skilled in the art and is omitted here for conciseness. After manual focusing, the user may release the focus button 212 and then the image sensing unit 202 switches to preview mode again, i.e. outputting the full-view area image 205a to the buffer memory unit 204. After the focusing operation, the user may enable the storage button 214 when he determines to take the picture. And when the storage button 214 is enabled, the buffer memory unit 204 sends the full-view area image 213 to the storage unit 210, and then the full-view area image 213 is then stored in the storage unit 210. The storage unit 210 may include various well-known device, such as Compact Flash Card, Memory Stick Card, Smart Media Card, Secure Disk Card, etc.

Figure 3A:
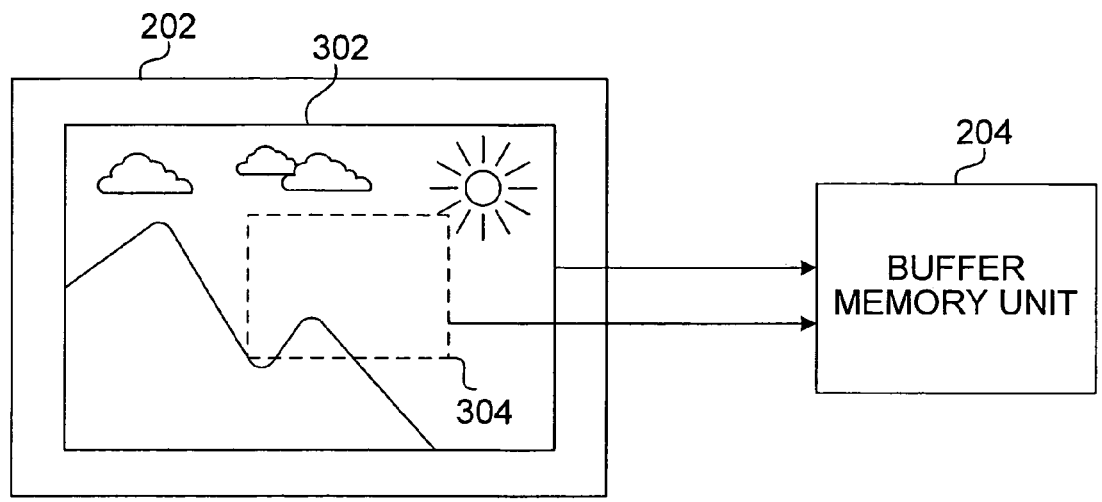
FIG. 3A illustrates a an image sensing area of a digital camera in accordance with the present invention.

FIG. 3A illustrates a full-view area image 302 and a focus-view area image 304 produced by the image sensing unit 202 in accordance with the present invention. When the image sensing unit 202 senses the analog signal 203 and proceeds analog-to-digital conversion operation, the full-view area image 302 and the focus-view area image 304 are produced as shown in FIG. 3A. The focus-view area image 304 is illustrated in an area surrounded by a dash line. Since the focus-view area image 304 is produced by image sensing unit 202 directly without additional resizing operation, the focus-view area image 304 is sent to image display unit 208 without losing its fidelity.

Figure 3B:
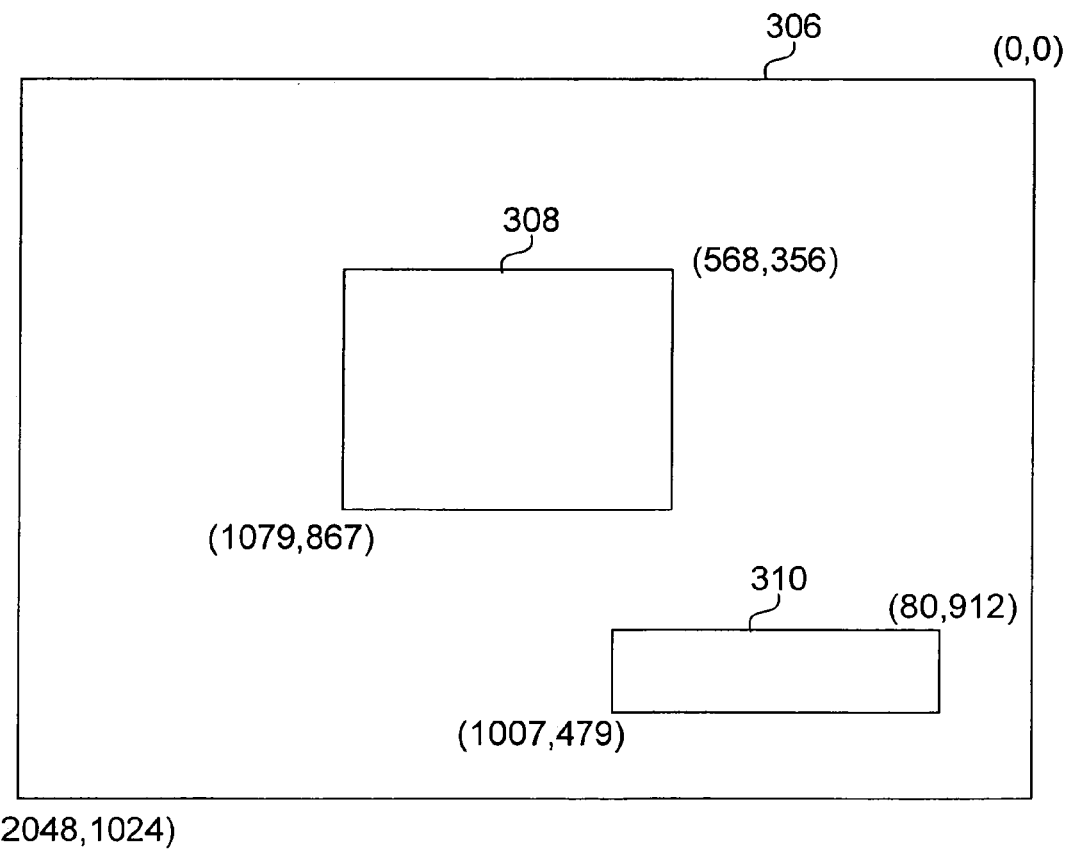
FIG. 3B illustrates another image sensing area of a digital camera in accordance with the present invention.

Users may select the position of focus-view area image in the full-view area image according to their need. As shown in FIG. 3B, a full-view area image 306 and two focus-view area images 308 and 310 are shown. The full-view area image 306 is a 2048*1024 image. The resolution of these images are recited as examples, and those skilled in the art may understand that other resolution may be implemented in the present invention. During the manual focusing operation, users select the position of the focus-view area image 308, 310 by the focus button 212 shown in FIG. 2. For example, a direction key may be provided in the focus button 212 to select the focus-view area image 308 in the central area or the focus-view area image 310 in bottom right area. In addition, an input function may also be provided allowing a user to input a starting coordinate and an ending coordinate to define the size of a focus-view area image. An input interface (not shown) may be provided with the focus button 212 allowing the user to input a starting coordinate (568, 356) and an ending coordinate (1079, 867) to define the focus-view area image 308. Similarly, the user may input a starting coordinate (80, 912) and an ending coordinate (1007, 479) to define the focus-view area image 310. The input interface may be any kind of device, such as number key, knob, arrow key, touch panel, or the like. Note that those who skilled in the art should understand the focus-view image may be obtained in any position in the full-view area image 306, or in any size. Alternatively, the user may dynamically adjust the size of the focus-view area image 308, 310 by the focus button 212, rather than inputting the coordinates via the input interface.

Figure 4:
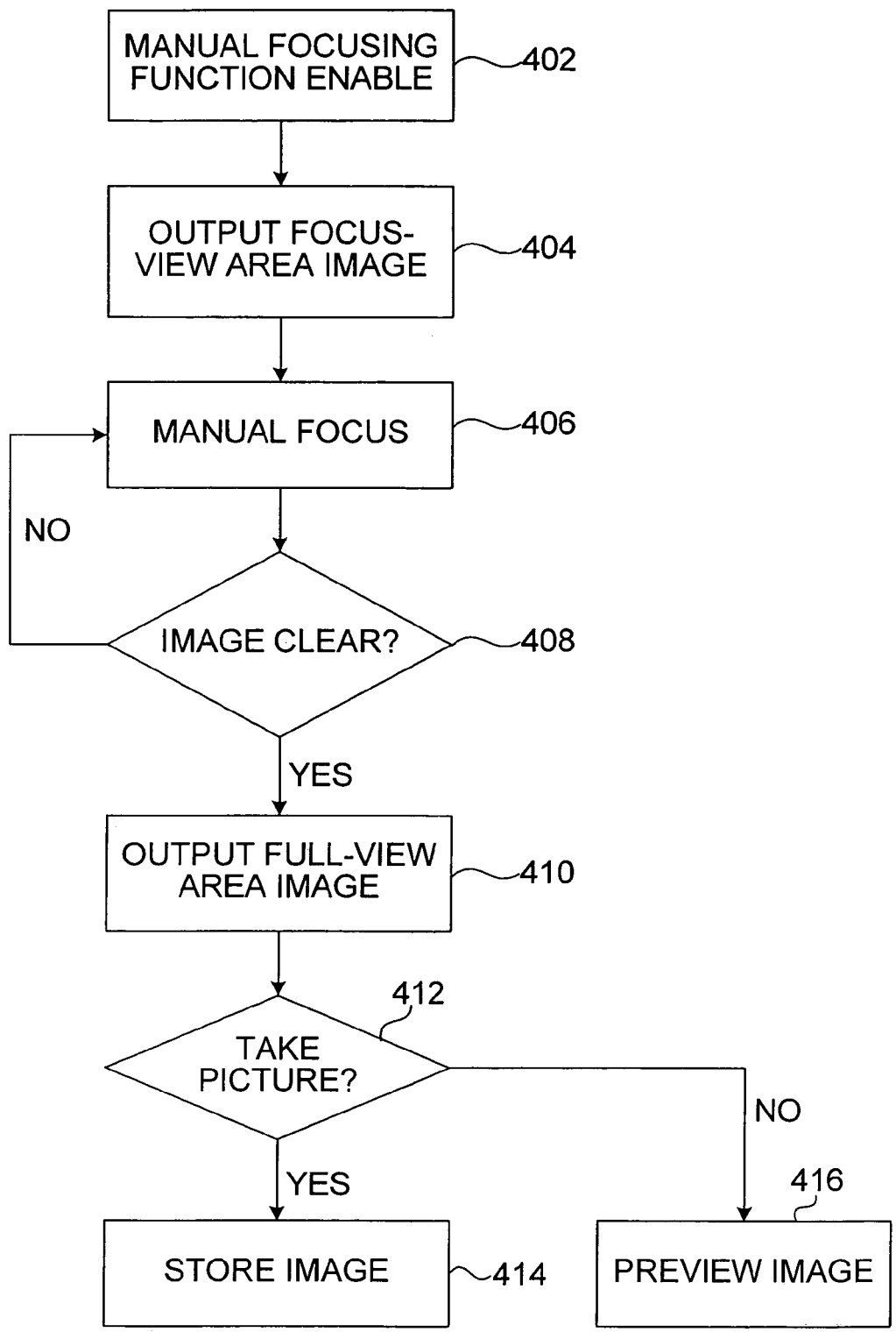
FIG. 4 illustrates flowchart of method for manually focusing the digital camera in accordance with the present invention.

FIG. 4 illustrates flowchart of method for manually focusing the digital camera in accordance with the present invention. The image sensing unit 202 senses analog signal 203 to produce selectively a full-view area image 302 and a focus-view area image 304. The method includes the following steps: The manual focusing function is enabled when a user enables the focus button 212 (step 402). The image sensing unit 202 outputs the focus-view area image 304 to the buffer memory unit 204 and then the buffer memory unit 204 outputs the focus-view image 304 to the image display unit 208 (step 404). The user manually focuses based on the focus-view area image 304 displayed by the image display unit 208 (step 406). The user reconfirms whether the image is well-focused in step 408, and if not, the process goes back to step 406. If accurate focus is obtained, the focus button 212 may be disabled and the full-view area image 302 is transferred from the image sensing unit 202 to the buffer memory unit 204, and then transferred to the image display unit 208 after being resized by the image processing unit 206 (step 410). The user determines whether to take a picture in step 412. If yes, the user enables the storage button 214 to enable a storage instruction, and then the full-view area image 302 is sent from the buffer memory unit 204 to the storage unit 210. The image is then stored in the storage unit 210 (step 414). Otherwise, the camera will enter the preview mode, i.e. outputting the full-view area image 302 to the buffer memory unit 204 (step 416).

Figure 5:
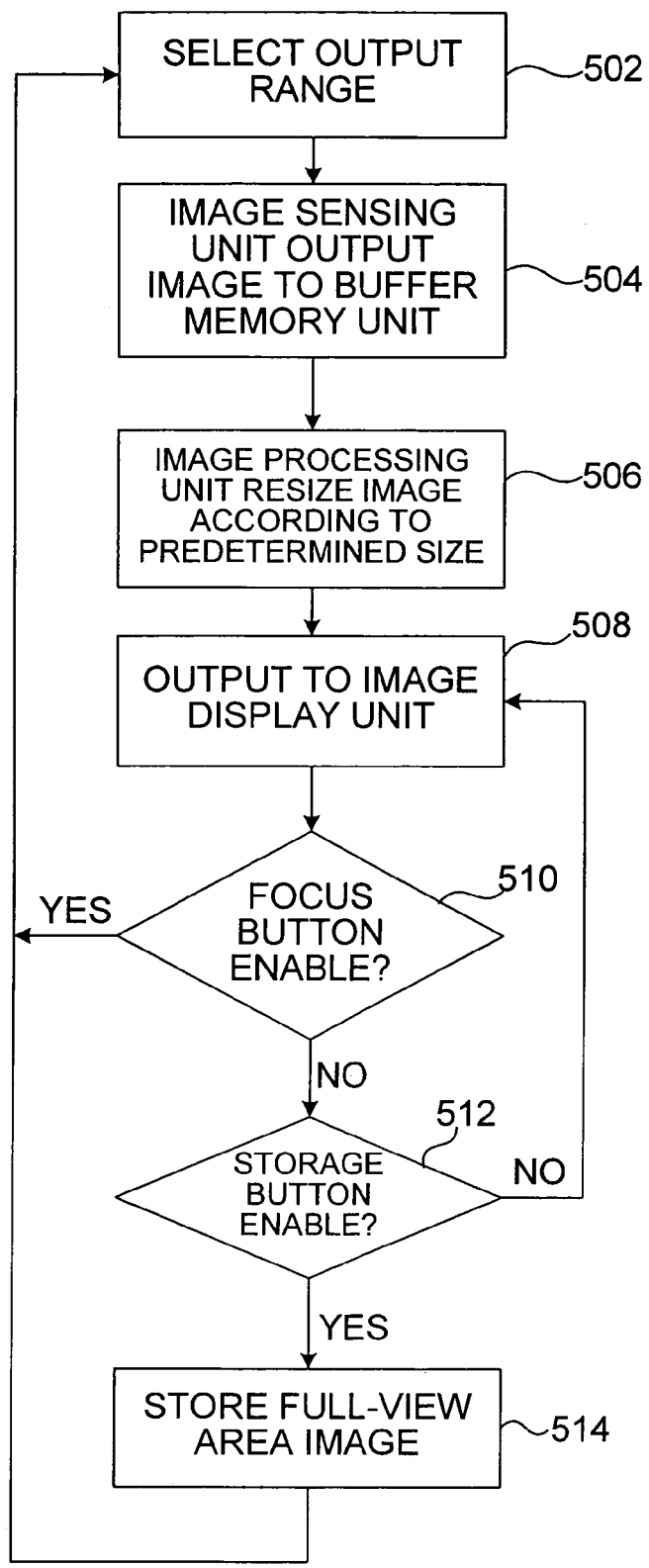
FIG. 5 illustrates another flowchart of method for manually focusing the digital camera in accordance with the present invention.

FIG. 5 illustrates another flowchart of method for manually focusing the digital camera in accordance with the present invention. The digital camera includes an image sensing unit with adjustable output range, a buffer memory unit, an image processing unit, an image display unit, a storage unit, a focus button, and a storage button. The method includes the following steps: The output range of the image sensing unit is selected in step 502 (full-view area image by default). This may be done manually by user or automatically by the camera according to the needs during photographing. The selection operation is same as above description regarding to FIG. 3B and is omitted here for conciseness. In step 504, the image sensing unit outputs the selected image to the buffer memory unit. In step 506, the image processing unit accesses the image stored in the buffer memory unit, and resizes the image according to a predetermined size. In this embodiment, the predetermined size may be a maximum resolution of the image display unit, i.e. the preferred display resolution. In other embodiment, however, the predetermined size may be set to other values as required.

In step 508, the resized image is outputted to the image display unit to be previewed by users. In step 510, it is determined whether the focus button is enabled. If yes, the process backs to step 502. It should be noted that the output image is a focus-view area image when the focus button is enabled. Alternatively, the step 506 may be bypassed if the resolution of focus-view area image is set to equal the resolution of image display unit, and the focus-view area image may be provided without resizing. If the focus button is disabled in step 510, it is determined whether the storage button is enabled in step 512. If yes, the full-view area image is stored in the storage unit in step 514. Afterward, the process may back to step 502. If the storage button is disabled in step 512, the process may back to step 508 and keep outputting the image which are previewed by a user.

The digital camera and method in accordance with the present invention may select various output images with different resolutions depending on requirement. The output image is clear and has better quality during manual focusing operation. Therefore, high quality images may be obtained in accordance with the present invention.

The above detailed description of the preferred embodiments is intended to describe features and spirits of the present invention. However, the disclosed preferred embodiments are not to limit the scope of the invention. On the contrary, the above description and various changes and equivalent arrangements are intended to be protected by the following claims. Therefore, the claims of the invention shall be interpreted in a broadest way on the basis of the above description and shall cover all possible equivalent changes and arrangements.

What is claimed is:

1. A method for manually focusing a digital camera, the digital camera including an image sensing unit, a buffer memory unit, an image processing unit, a focus button, and an image display unit, the method comprising the steps of:
   the image sensing unit sensing a signal to produce a full-view area image and a focus-view area image;
   the image sensing unit selectively outputting the full-view area image and the focus-view area image to the buffer memory unit; and
   the buffer memory unit outputting the focus-view area image to the image display unit allowing a user to focus manually when the focus button is enabled to select the focus-view area image outputted to the buffer memory unit.

2. The method of claim 1, further comprising the following steps when the image sensing unit outputting the full-view area image to the buffer memory unit:
   the buffer memory unit outputting the full-view area image to the image processing unit;
   the image processing unit resizing the full-view area image according to a predetermined size; and
   the image processing unit outputting the resized full-view area image of the predetermined size to the image display unit allowing browsing by the user.

3. The method of claim 2, wherein the digital camera further comprises a storage unit, and the method further comprises the following steps when the image sensing unit outputting the full-view area image to the buffer memory unit:
   the buffer memory unit selectively outputting the full-view area image to the storage unit; and
   storing the full-view area image into the storage unit.

4. A digital camera with a manual focusing function, comprising:
   an image sensing unit for sensing a signal to produce a full-view area image and a focus-view area image;
   a buffer memory unit, coupled to the image sensing unit, for buffering the full-view area image or the focus-view area image from the image sensing unit,
   an image processing unit coupled to the buffer memory unit,
   an image display unit coupled to the image processing unit and the buffer memory unit; and
   a focus button for selecting between the full-view area image and the focus-view area image;
   wherein the buffer memory unit outputs the focus-view area image to the image display unit allowing a user to focus manually when the focus button is enabled to select the focus-view area image outputted to the buffer memory unit; and
   the buffer memory unit outputs the full-view area image to the image processing unit when the focus button is disabled to select the full-view area image outputted to the buffer memory unit; the image processing unit resizes the full-view area image according to a predetermined size; and the image processing unit outputs the resized full-view area image of the predetermined size to the image display unit allowing browsing by the user.

5. The digital camera of claim 4, further comprising a storage unit, wherein the buffer memory unit selectively outputting the full-view area image to the storage unit for storage when the image sensing unit outputting the full-view area image to the buffer memory unit.

6. The digital camera of claim 5, further comprising a storage button coupled to the buffer memory unit, wherein the storage button sends a storage signal, in response to an operation by a user, commanding the buffer memory unit to output the full-view area image to the storage unit.

7. The digital camera of claim 4, wherein the predetermined size corresponds to a display resolution of the image display unit.

8. A method for manually focusing a digital camera, the digital camera including an image sensing unit with an adjustable range of an outputted image, a buffer memory unit, an image processing unit, a focus button, and an image display unit, the method comprising the steps of:
   (a) selecting range of the outputted image for the image sensing unit;
   (b) the image sensing unit outputting an area image according to the selected range to the buffer memory unit;
   (c) the image processing unit retrieving the area image in the buffer memory unit and resizing the area image according to a predetermined size;
   (d) outputting the resized area image to the image display unit allowing browsing by a user;
   (e) determining a status of the focus button; and
   (f) repeating the step (a) to step (d), when the focus button is enabled, for outputting a focus-view area image allowing the user manually focusing the focus-view area image.

9. The method of claim 8, wherein the image sensing unit with the adjustable range of the outputted image in step (a) is at least adjusted between a range corresponding to a full-view area image and another range corresponding to the focus-view area image.

10. The method of claim 9, wherein a maximum of the adjusted range is, by default, a range corresponding to the full-view area image.

11. The method of claim 8, the predetermined size in step (c) corresponds to a maximum display resolution of the image display unit.

* * * * *